United States Patent Office 2,889,545
Patented June 2, 1959

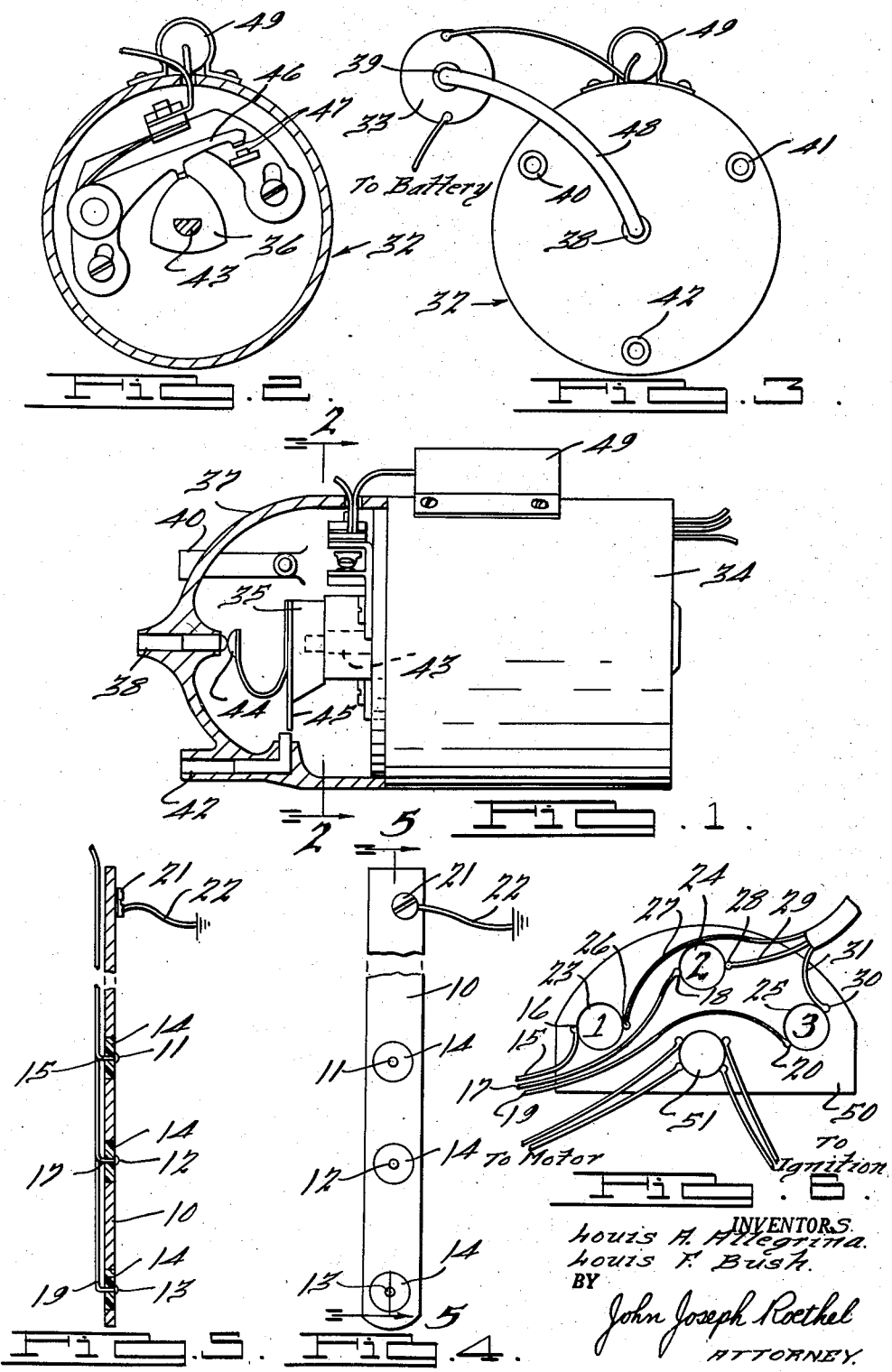

2,889,545

ELECTRICAL OIL LEVEL MEASURING DEVICE

Louis A. Allegrina, Detroit, and Louis F. Bush,
Milan, Mich.

Application May 29, 1956, Serial No. 588,065

6 Claims. (Cl. 340—244)

This invention relates to a fluid level indicating device and more particularly to an electrically operated device adapted to indicate at a remote signal station the oil level in a vehicle crankcase.

In its illustrated embodiment the present invention comprises a metal oil dip stick having spaced electrodes along its length, the electrodes being insulated from the metal of the dip stick by any suitable insulation material whereby a spark gap is provided between each electrode and the metal dip stick. Each electrode comprises an element of an electrical circuit including an electric light bulb, there being as many light bulbs as there are electrodes on the dip stick. Also included in the circuits between the electrodes and the light bulbs is a means for sequentially connecting each electrode to a high potential source of electrical energy. Should any electrode be exposed above the level of the oil in a crankcase, upon connection of the electrode circuit to a high tension current a spark will jump the gap between the electrode and the metal dip stick thereby momentarily closing the circuit and causing the light bulb in series with said electrode to momentarily flash, the light bulb indicating through suitable indicia adjacent thereto which electrode is exposed. If more than one electrode is exposed, more than one light bulb will be sequentially flashed on and off. The indicia may directly indicate how many quarts of oil would be required to fill the crankcase. Those electrodes below the level of the oil in the crankcase would be insulated by the oil from the metal of the dip stick to the extent that no spark could jump the gap between the electrode and the metal dip stick and the light bulbs in series therewith would remain dark.

Further objects and advantages of the present invention and the features of construction used to attain the same will be apparent from the following description and appended claims, reference being had to the accompanying drawing forming a part of this specification wherein like reference numerals designate corresponding parts in the several views.

Fig. 1 is an elevation in part sectional illustrating a means for sequentially energizing the electrodes of the oil level indicating means embodying the present invention.

Fig. 2 is a section taken substantially through line 2—2 of Fig. 1 looking in the direction of the arrows.

Fig. 3 is an end elevation of Fig. 1.

Fig. 4 is a front elevation of a metal dip stick embodying the present invention.

Fig. 5 is a sectional view of Fig. 4 taken substantially along the line 5—5 of Fig. 4 looking in the direction of the arrows.

Fig. 6 is a view illustrating the remote signal station for indicating the oil level in a vehicle crankcase.

Before explaining in detail the present invention, it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation.

In the drawing there is illustrated, by way of example, an embodiment of the present invention comprising a metal dip stick 10 adapted to be inserted in the dip stick hole of a vehicle crankcase. The metal dip stick 10 has mounted therein along its length several electrodes. In the illustrated embodiment of the invention there are at least three of these electrodes shown, the electrodes being designated 11, 12 and 13, respectively. Each electrode is insulated from the metal dip stick by suitable spacers 14 made of any suitable dielectric material. Each electrode is connected to one end of a conductor the other end of which is connected to one terminal of a light bulb socket.

As illustrated, the electrode 11 is connected through conductor 15 to light bulb socket terminal 16; electrode 12 through conductor 17 to light bulb socket terminal 18; and electrode 13 through conductor 19 to light bulb socket terminal 20.

It will be noted that the dip stick 10 is provided with a terminal 21 to which a ground wire 22 is attached. The ground wire 22 is suitably connected or grounded to any part of the vehicle frame.

The light bulb socket 23 having the terminal 16 thereon has its second terminal 26 connected to one end of a conductor 27. The light bulb socket 24 having the terminal 18 thereon has its second terminal 28 connected to one end of a conductor 29. And, the light bulb socket 25 having the terminal 20 thereon has its second terminal 30 connected to one end of a conductor 31. Thus, each light bulb socket is in series with an electrode on the dip stick. The conductors leading to the light bulb sockets, that is, the conductors 27, 29 and 31, respectively, are adapted to be intermittently connected to a source of high potential electric energy.

Thus, if a high tension current is transmitted through conductor 27 to the light bulb socket 23 and then through conductor 15 to electrode 11, the current would have a tendency to jump the gap from the electrode 11 to the metal dip stick and complete the circuit through the ground. A light bulb in the socket 23 would thus momentarily light up. If the electrode 11 were covered by oil, the oil would insulate against the spark jumping from the electrode to the metal dip stick and the circuit would not be completed. Therefore, the light bulb in the light bulb socket 23 could not light up. By having suitable indicia in front of the light bulbs, such as the numerals 1, 2 and 3 shown in the light bulb sockets 23, 24 and 25, respectively, it may be readily determined which of the electrodes is exposed above the oil level in the vehicle crankcase. The numerals 1, 2 and 3 in the light bulb sockets 23, 24 and 25, respectively, could also indicate the quantity of oil in quarts that would be required to replenish the crankcase to bring the oil level therein up to the full mark.

Figs. 1, 2 and 3 of the present drawing illustrate a means for sequentially energizing each of the electrode circuits with high tension current. The mechanism illustrated in Figs. 1, 2 and 3 is essentially a duplicate of the distributor system of the ignition circuit of the vehicle. The mechanism comprises a distributor 32, a coil 33 and a motor means for driving the distributor rotor, the motor means being generally designated 34 and the rotor being designated 35. The rotor cam 36 is illustrating as having three lobes, there being one lobe for each of the electrodes on the oil dip stick. The distributor cap 37 has a center terminal 38 which connects with the high tension terminal 39 of the induction coil 33. The distributor cap also has three terminals, designated 40, 41 and 42 equally spaced around it, as there are three electrodes to be fired. For example, the terminal 40 would have conductor 27 attached thereto, the terminal 41 would have conductor 29 attached thereto, and the terminal 42 would have conductor 31 attached thereto.

As in any conventional distributor, the rotor or distributor arm 35, is mounted on the upper end of the distributor shaft 43 on which the breaker cam 36 also is located. A center terminal 44 of the rotor makes contact with the center terminal 38 of the head or cap 37. The arm 45 of the rotor is adapted to complete the circuits successively with the terminals leading to the electrodes. The distributor illustrated is of the gap type, that is, the rotor arm 45 does not make actual contact with the electrode terminals, but instead simply passes close enough so that high tension current must jump a small gap between the arm and the terminal.

In operation, each time a lobe of the breaker cam 36 comes in contact with the breaker arm 46 the breaker points 47 are separated and current is produced in the high tension winding of the coil 33 by mutual induction. This high-tension current is conducted through the central terminal 38 of the distributor cap by a highly insulated wire 48; from that point it passes down to the rotor 35 from the end of the arm 45 of which it jumps to one of the electrode terminals; it then goes to the light bulb socket and to the electrode. And, if the electrode is not surrounded by oil, it jumps across the dielectric spacer 14 to the dip stick, and completes the circuit through the ground 22. If the circuit is completed as aforementioned, the light bulb in the circuit will light up.

The distributor is shown with a conventional condenser 49 mounted thereon which condenser has a function of preventing sparking across the breaker points 47. The distributor shaft in the present embodiment is adapted to be driven by a small electric motor 34, either a six volt or twelve volt motor depending upon the voltage of the battery being used in the particular vehicle. Mounted on the panel 50 behind which the light bulbs are visible is a switch 51 adapted to be closed to cause excitation of the motor and rotation thereof. The switch may be a push button type since it need be held shut only for a relatively short time in order to permit a determination of the oil level in the crankcase to be made.

The foregoing structure is believed to provide a simple and reliable means for determining the oil level in the crankcase at any time. The device may be operated at any time, that is, regardless of whether the vehicle is in motion or at a standstill. By noting which of the light bulbs are flashing on and off, the operator of the vehicle may readily determine substantially the amount of oil that has been used and how much would be required to replenish the crankcase to bring it up to a full condition.

We claim:

1. An electrical indicating device adapted to indicate the fluid level in a chamber containing non-conductive fluid, comprising a series of spark gap means adapted to be normally disposed below the surface of said fluid in non-conducting condition, each spark gap means comprising part of an electrical circuit including a signal means, and means for sequentially feeding high tension current to each circuit, whereby if any spark gap means is exposed above fluid level a spark will be produced thereby momentarily closing the circuit of which it is a part, said signal means upon the closing of said circuit indicating the exposed spark gap means and thereby the approximate fluid level in the chamber.

2. An electrical indicating device adapted to indicate the fluid level in a chamber containing non-conductive fluid, comprising a series of spark gap means adapted to be normally disposed below the surface of said fluid in non-conducting condition, each spark gap means comprising part of an electrical circuit including a signal means, distributor means for sequentially feeding high tension current to each circuit, whereby if any spark gap means is exposed above fluid level a spark will be produced thereby momentarily closing the circuit of which it is a part, said signal means upon the closing of said circuit indicating the exposed spark gap means and thereby the approximate fluid level in the chamber, and manually operable means actuatable to put said distributor means in operation.

3. An electrical indicating device adapted to indicate the fluid level in a reservoir containing non-conductive fluid, comprising a conductive member insertible in said reservoir, spaced electrodes positioned along said member, dielectric spacer means insulating said electrodes from said member, each electrode comprising a part of a separate circuit including a signal means, a source of high tension current, and means for sequentially causing the feeding of high tension current to each electrode circuit whereby if any electrode is above the level of fluid in said reservoir a spark will jump across the dielectric spacer means to said member thereby momentarily closing the circuit of which said electrode is a part, said signal means upon the closing of said circuit indicating the exposed electrode and thereby the fluid level in said reservoir.

4. An electrical indicating device adapted to indicate the fluid level in a reservoir containing nonconductive fluid, comprising a conductive member insertible in said reservoir, means grounding said member, spaced electrodes positioned along said member, dielectric spacer means insulating said electrodes from said member, each electrode comprising a part of a separate circuit including a signal means, a source of high tension current, distributor means for sequentially causing the feeding of high tension current to each electrode circuit whereby if any one or more electrodes are above the level of fluid in said reservoir a spark will jump across the respective dielectric spacer means to said member thereby momentarily closing the one or more circuits of which said one or more electrodes are a part, said signal means upon the closing of said circuit indicating the exposed electrode and thereby the fluid level in said reservoir, and manually operable means actuatable to put said distributor means in operation.

5. An oil level indicating device comprising an electrode carrying member, said carrying member being in part an electrical conductor, spaced electrodes positioned along said carrying member, dielectric spacer means insulating each electrode from said carrying member, said electrodes being adapted to be normally disposed beneath the oil surface and thereby normally insulated from said carrying member, each electrode comprising a part of a separate circuit including a signal means, a source of high tension current, and means for sequentially causing the feeding of high tension current to each electrode circuit whereby if an electrode is above the reservoir fluid level a spark will jump across the dielectric spacer means to said member thereby momentarily closing said circuit, said signal means upon the closing of said circuit indicating the exposed electrode and thereby the approximate fluid level in said reservoir.

6. An oil level indicating device comprising an electrode carrying member, said carrying member being in part an electrical conductor, spaced electrodes positioned along said carrying member, dielectric spacer means insulating each electrode from said carrying member, said electrodes being adapted to be normally disposed beneath the oil surface and thereby normally insulated from said carrying member, each electrode comprising a part of a separate circuit including a signal means, a source of high tension current, distributor means for sequentially causing the feeding of high tension current to each electrode circuit whereby if an electrode is above the reservoir fluid level a spark will jump across the dielectric spacer means to said member thereby momentarily closing said circuit, said signal means upon the closing of said circuit indicating the exposed electrode and thereby the approximate fluid level in said reservoir, and manually operable means actuatable to put said distributor means in operation.

References Cited in the file of this patent
UNITED STATES PATENTS

| | | |
|---|---|---|
| 705,421 | Moore | July 22, 1902 |
| 1,127,084 | Ogilvie et al. | Feb. 2, 1915 |
| 2,385,161 | Pinkerton | Sept. 18, 1945 |
| 2,452,615 | Thomson | Nov. 2, 1948 |
| 2,551,225 | Spierer | May 1, 1951 |